March 29, 1955 A. C. VINE ET AL 2,704,936

SUBMARINE BATHYTHERMOGRAPH

Filed Oct. 22, 1953 8 Sheets-Sheet 1

Inventors:
ALLYN C. VINE, ALFRED C. REDFIELD,
ABRAHAM W. JACOBSON, JOHN L. RUSSELL by Wilson R. Maltby
D. C. Snyder Attorneys March 29, 1955 A. C. VINE ET AL 2,704,936

SUBMARINE BATHYTHERMOGRAPH

Filed Oct. 22, 1953 8 Sheets-Sheet 2

Inventors:
ALLYN C. VINE
ALFRED C. REDFIELD
ABRAHAM W. JACOBSON
JOHN L. RUSSELL by Wilson R. Maltby
D.C. Snyder
Attorneys Inventors:
ALLYN C. VINE
ALFRED C. REDFIELD
ABRAHAM W. JACOBSON
JOHN L. RUSSELL by Wilson R. Maltby
D. C. Snyder
Attorneys March 29, 1955 A. C. VINE ET AL 2,704,936

SUBMARINE BATHYTHERMOGRAPH

Filed Oct. 22, 1953 8 Sheets-Sheet 4

Inventors:
ALLYN C. VINE
ALFRED C. REDFIELD
ABRAHAM W. JACOBSON
JOHN L. RUSSELL by Wilson R. Maltby
D. C. Snyder
Attorneys Inventors:
ALLYN C. VINE
ALFRED C. REDFIELD
ABRAHAM W. JACOBSON
JOHN L. RUSSELL
Wilson R. Maltby
by D. C. Snyder
Attorneys Inventors:
ALLYN C. VINE
ALFRED C. REDFIELD
ABRAHAM W. JACOBSON
JOHN L. RUSSELL
by Wilson P. Maltby
D. C. Snyder
Attorneys Inventors:
ALLYN C. VINE, ALFRED C. REDFIELD,
ABRAHAM W. JACOBSON, JOHN L. RUSSELL by Wilson R. Maltby
D. C. Snyder
Attorneys Inventors:
ALLYN C. VINE,
ALFRED C. REDFIELD,
ABRAHAM W. JACOBSON,
JOHN L. RUSSELL W. R. Maltby
D. C. Snyder by Attorney United States Patent Office 2,704,936 Patented Mar. 29, 1955

2,704,936

SUBMARINE BATHYTHERMOGRAPH

Allyn C. Vine and Alfred C. Redfield, Woods Hole, Mass., and Abraham W. Jacobson, New Haven, and John L. Russell, Naugatuck, Conn., assignors to the United States of America as represented by the Secretary of the Navy Application October 22, 1953, Serial No. 387,816

5 Claims. (Cl. 73—178)

This invention relates to an electromechanical apparatus for measuring and integrating various sea water variables, especially those variables which are important in connection with the operation of underwater craft, and which have to do with ballast changing and underwater sound velocity determinations.

When operating a submarine under water, it is exceedingly important to know as accurately as possible what the buoyancy of the vessel is in order to maintain the vessel at a desired depth or to facilitate other types of operation. A vessel in good trim, at a given point under water, is said to have zero buoyancy. If the vessel moves to different depths or to a point where the density of the sea water changes, then a change in ballast becomes necessary in order to re-establish zero buoyancy. Change in ballast is also dependent upon the hull compressibility of the submarine as well as density of sea water, and the latter value in turn depends upon calculations involving the integration of other sea water variables such as temperature, salinity and pressure. Inasmuch as sea water variables such as temperature, pressure, salinity and the like, as measured in one region in sea water, may vary appreciably from similar determinations taken in other regions, it becomes very difficult to record changes in these variables and rapidly to make calculations which can be relied upon to determine ballast changes during the operation of a submarine. A somewhat analogous situation prevails with respect to making sound velocity determinations under water.

The present invention is related to U. S. Patent No. 2,579,220, issued December 18, 1951, to A. C. Vine for Apparatus for Indicating Ballast Changes Necessary to Maintain Submersed Submarines in Trim, which discloses a method and apparatus by which the computation of buoyancy can be made.

The present invention is directed to the complete instrumentation in which the sea water temperature and conductivity measurements are automatically performed by separate self-balancing mechanisms which produce mechanical motions indicative of the measured quantities. The mechanical motions in turn act to produce or modify electrical voltages which are then combined in accordance with an empirical mathematical function to derive an accurately computed indication of the desired variable. The empirical relationship employed yields computations which are in substantial agreement with established oceanographic tables found, for example, in "The Oceans," H. U. Sverdrup, M. W. Johnson, R. H. Fleming, Prentice-Hall, Inc., New York, N. Y., 1942, pages 47–57. Reference may also be made to a paper by A. W. Jacobson "Transactions of the American Institute of Electrical Engineers," vol. 67, 1948, "An instrument for recording continuously the salinity, temperature and depth of sea water."

Other objects and many of the attendant advantages of this invention will be readily appreciated as the same becomes better understood by reference to the following detailed description when considered in connection with the accompanying drawings wherein.

Figure 1:
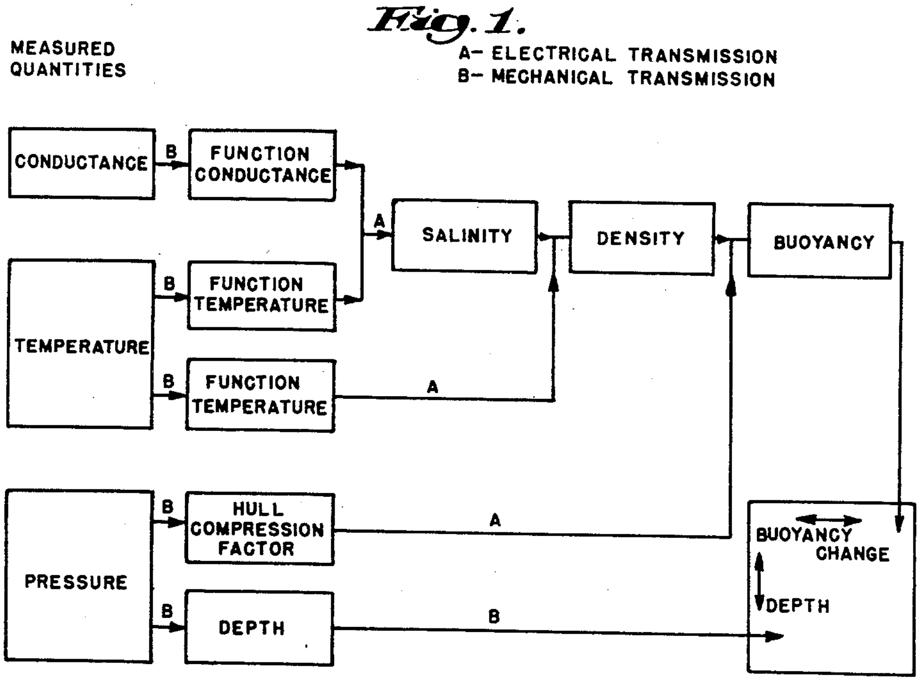
Fig. 1 is a diagrammatic view illustrating a series of convergent steps carried out with respect to various sea water variables in determining ballast changes.
Figure 3:
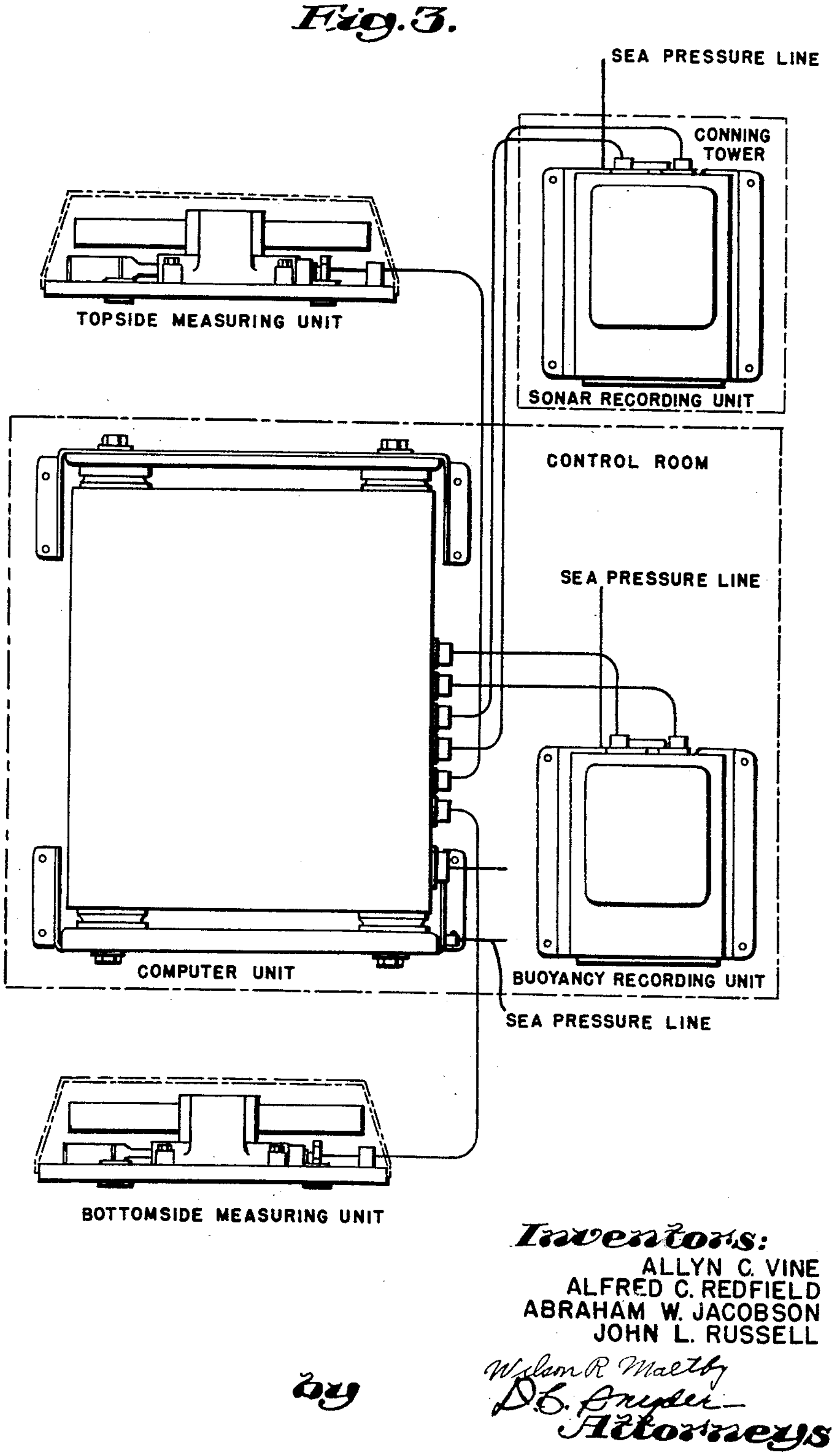
Fig. 3 is a block diagram generally indicating a plurality of measuring and computing units which are connected together to form the complete apparatus of the invention.
Figure 4:
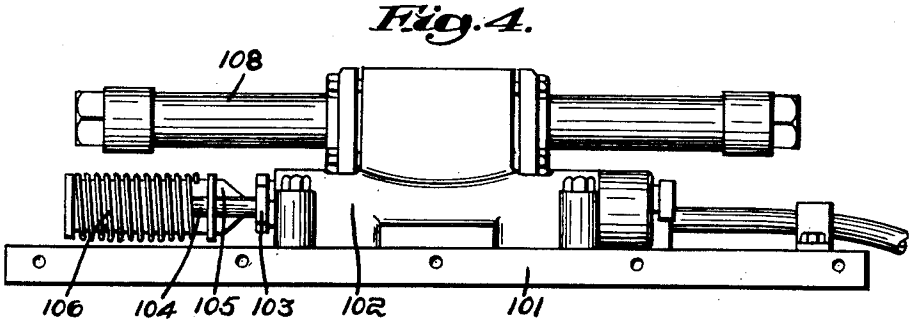
Fig. 4 is an enlarged elevational view of one of the measuring units illustrated diagrammatically in Fig. 3.
Figure 5:
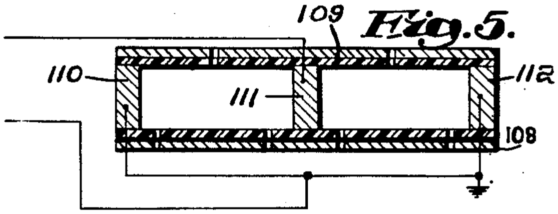
Fig. 5 is a diagrammatic view further illustrating a conductivity cell which forms a part of the measuring unit of Fig. 4.
Figure 5A:
Figure 6:
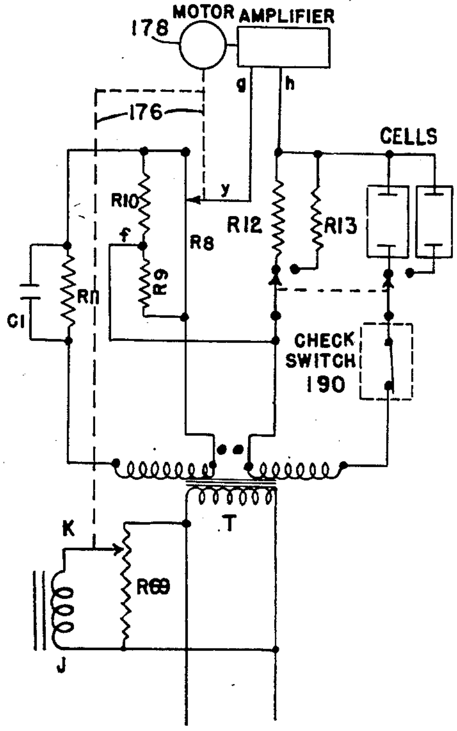
Figure 7:
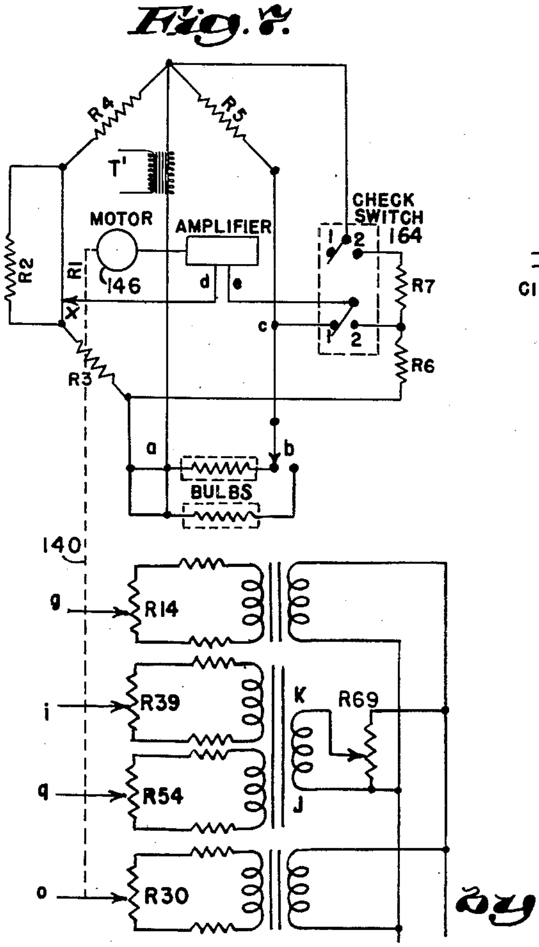
Figure 8:
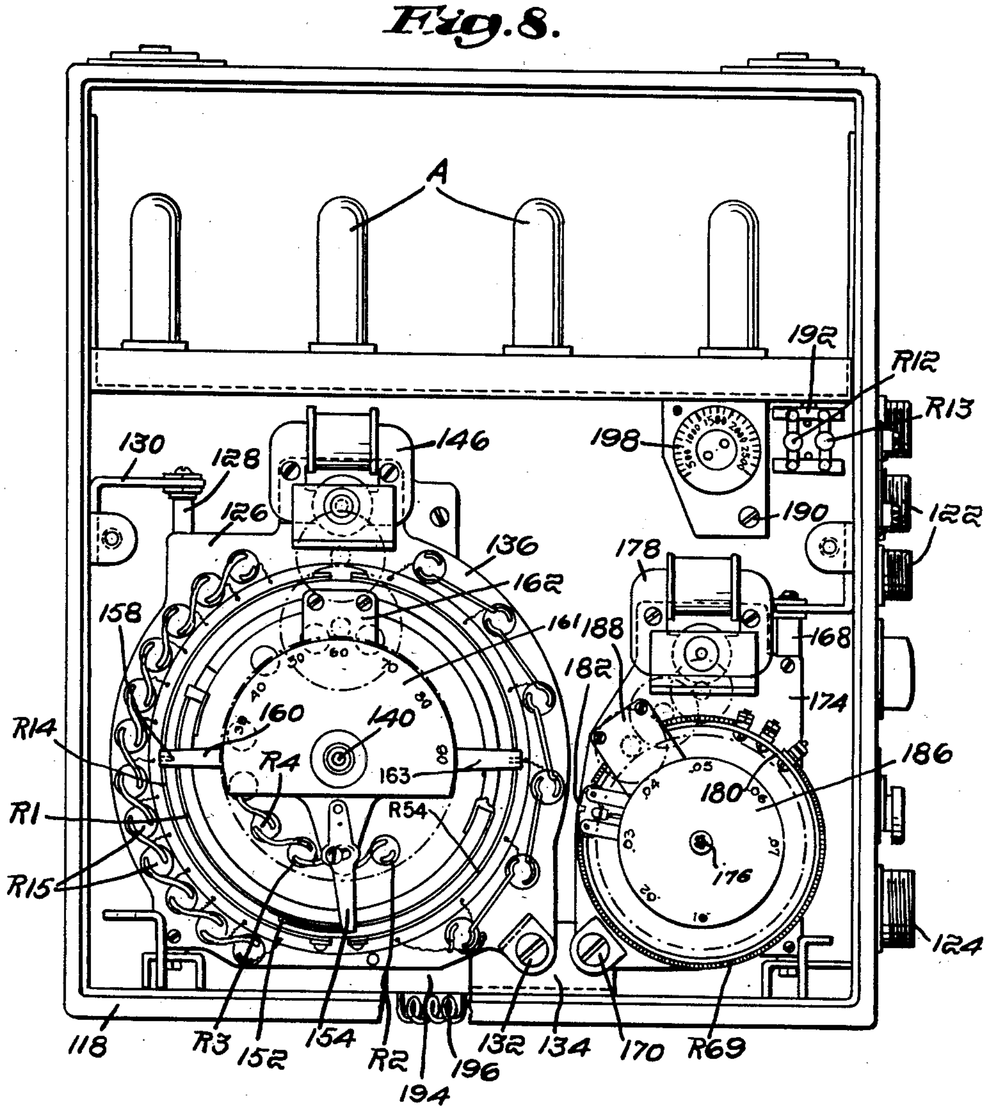
Figure 9:
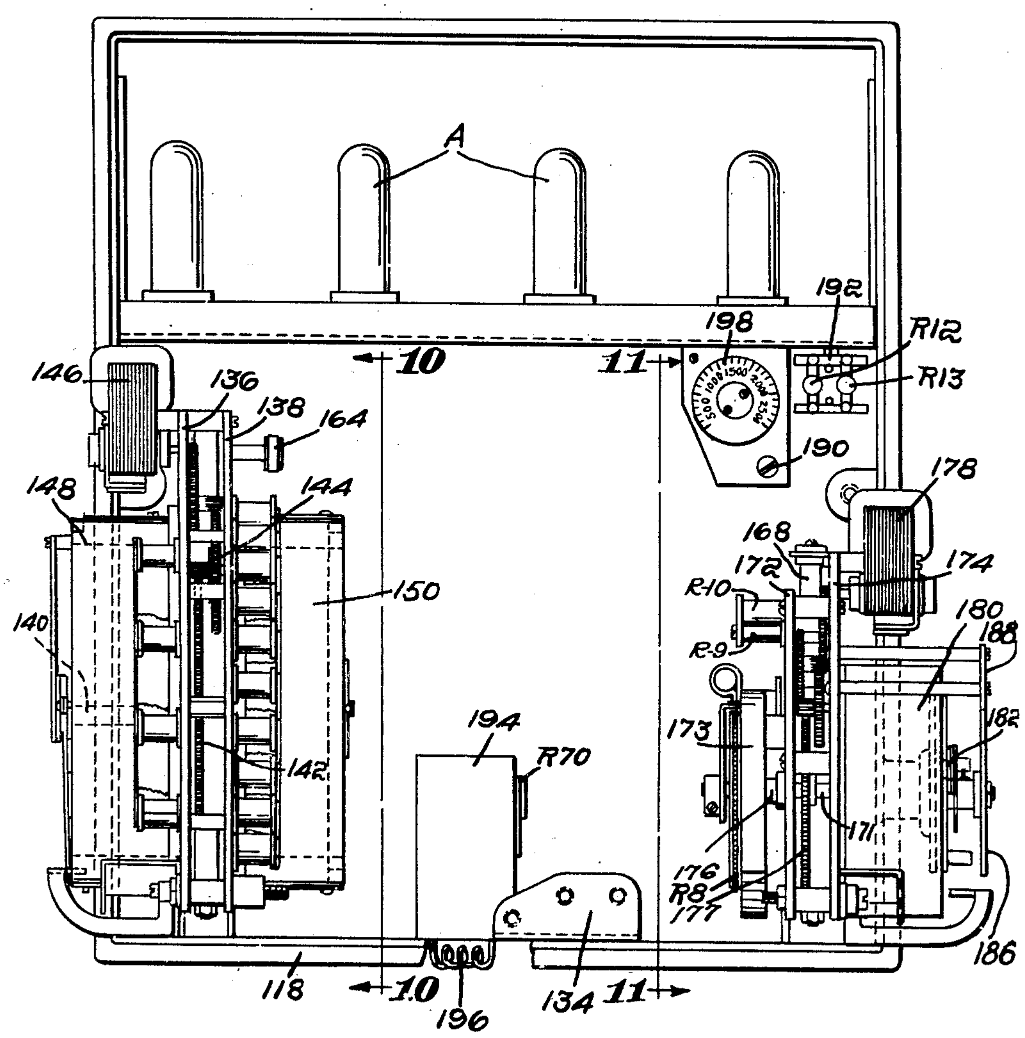
Figure 10:
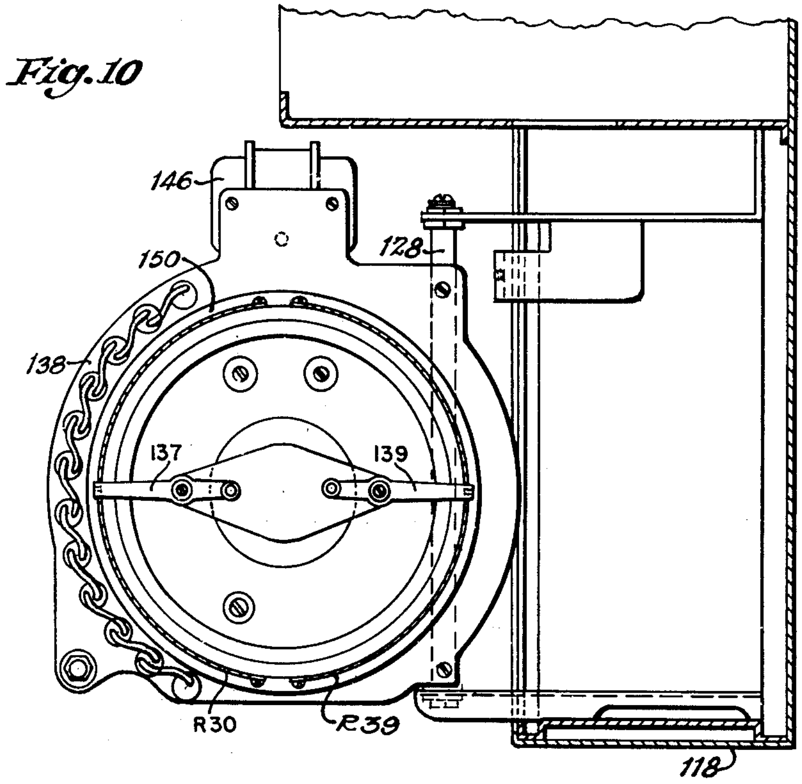
Figure 11:
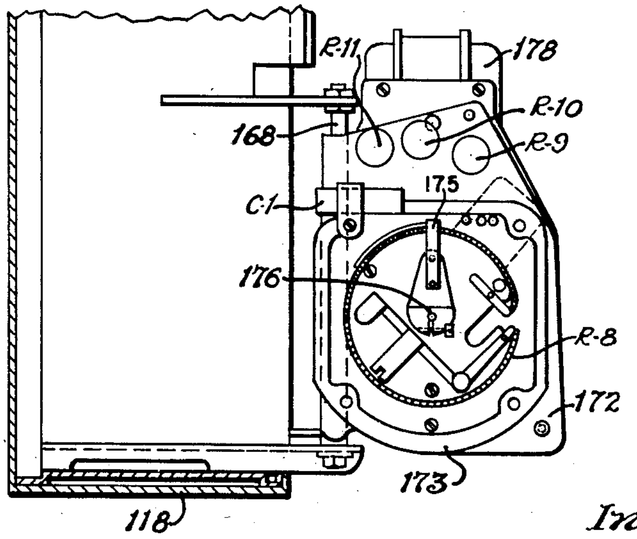
Figure 12:
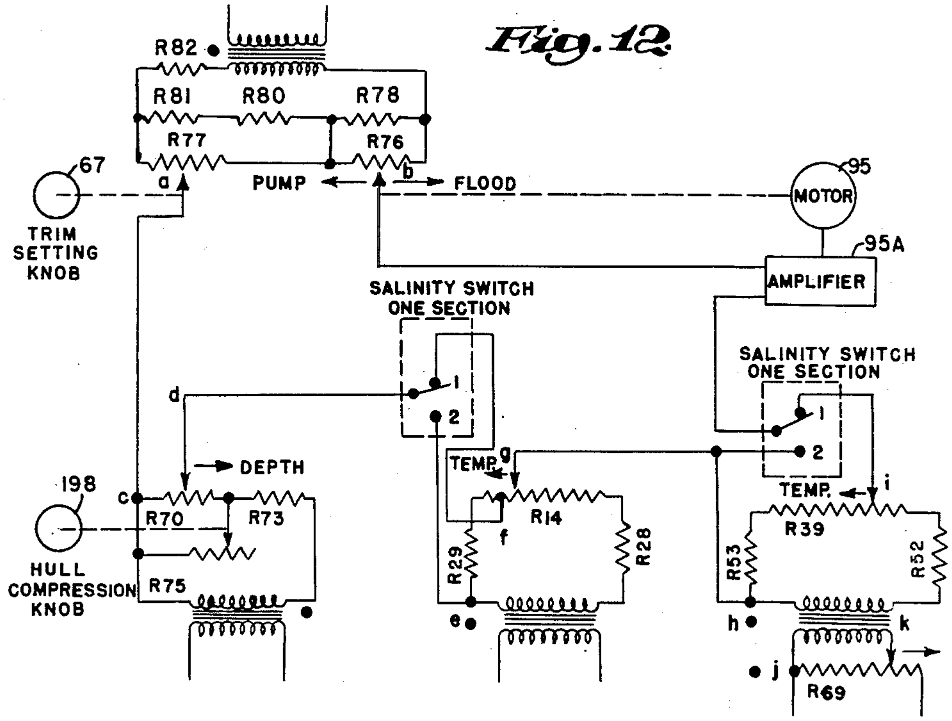
Figure 13:
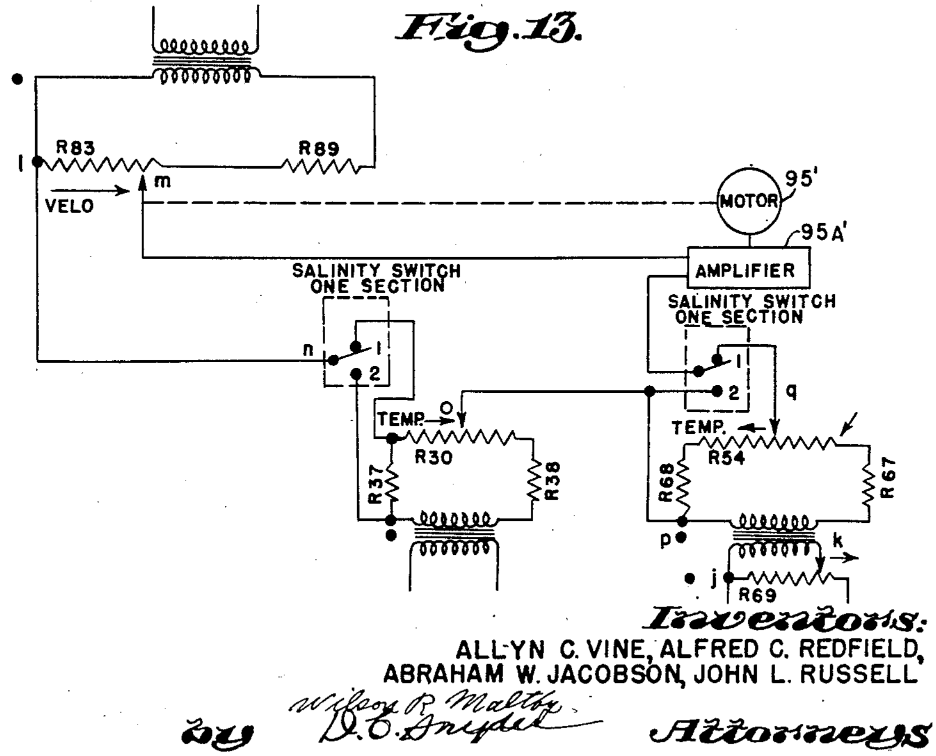
Figure 14:
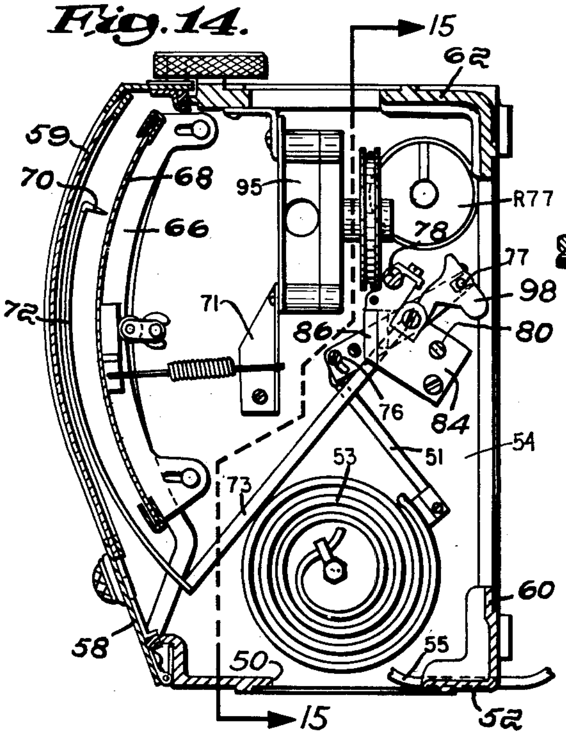
Figure 15:
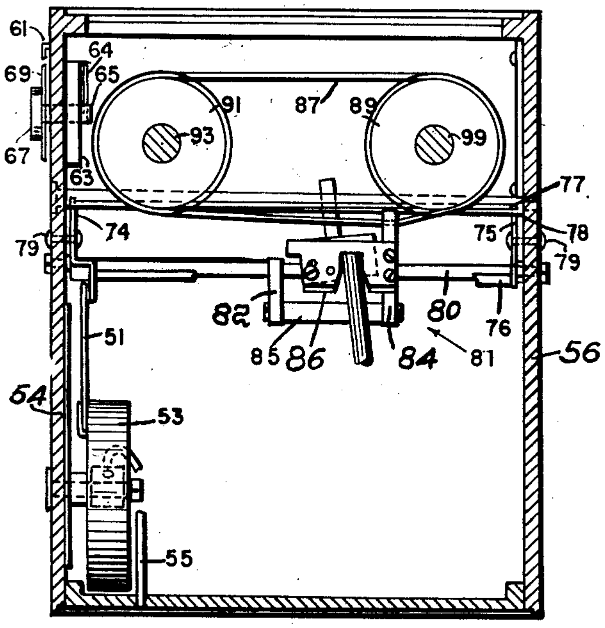
Figure 16:
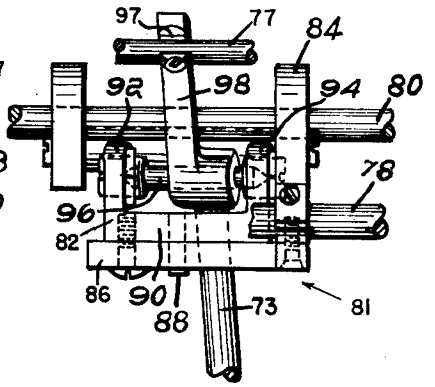
Figures 17, 18:
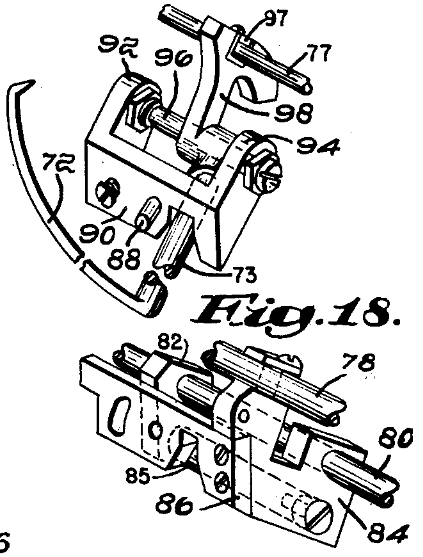

Fig. 5*a* is a detail cross-sectional view of a temperature bulb element forming a part of the device shown in Fig. 4;

Fig. 6 is a schematic wiring diagram illustrating circuit elements employed in converting conductivity measurements of the cell shown in Fig. 5 into fluctuating voltage values;

Fig. 7 is another schematic wiring diagram illustrating circuit elements for converting temperature measurements of the bulb indicated in Figs. 4 and 5*a* into fluctuating voltage values;

Fig. 8 is an elevational view of the computer unit shown in Fig. 3 and indicating a casing with its cover removed to disclose potentiometer members employed to carry out the conversion steps indicated in Figs. 1, 6 and 7;

Fig. 9 is a view similar to Fig. 8 with the potentiometer members of Fig. 8 being swung out of the casing about vertical supporting axes;

Fig. 10 is another elevational view of the potentiometer members shown at the left-hand side of the casing as viewed in Figs. 8 and 9;

Fig. 11 is an elevational view further illustrating the potentiometer members shown at the right-hand side of the casing as viewed in Figs. 8 and 9;

Fig. 12 is a circuit diagram of the computer and recorder for buoyancy changes;

Fig. 13 is a circuit diagram of the computer and recorder for sound velocity;

Fig. 14 is a vertical cross-sectional view taken of the recorder mechanism;

Fig. 15 is a cross section of the recorder mechanism taken on line 15—15 of Fig. 14;

Fig. 16 is a detailed elevational view of the recorder mechanism;

Fig. 17 is a prospective view of the pen arm carriage; and

Fig. 18 is another prospective view of the pen arm carriage.

Figure 2:
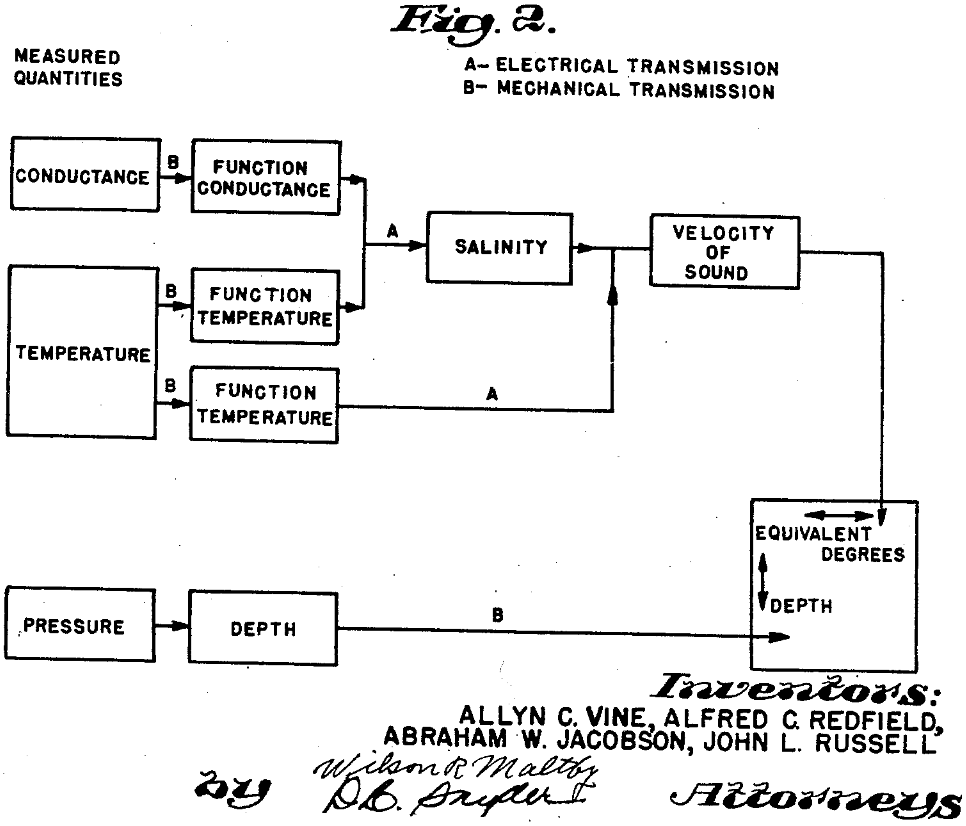
Fig. 2 is another diagrammatic view illustrating a series of conversion steps relating to sea water variables and employed in making sound velocity determinations.

Referring more in detail to the drawings, the essential functions of the apparatus of the invention and the sequence in which they occur have been diagrammatically illustrated in Figs. 1 and 2. As indicated in Fig. 1, for example, three sea water variables consisting of conductance, temperature and pressure are dealt with as a preferred embodiment of the invention, and these variables are referred to as measured quantities. From the measured quantities, conductance and temperature, and with the aid of well known sea water data, there are derived certain functions which can conveniently be represented as electrical values. The algebraic sum of these values may be computed to obtain more complex sea water variables such as salinity and density. From the measured quantity, pressure, there are obtained hull compressibility and depth values. The compressibility factor, when electrically combined with density, furnishes buoyancy data, while depth readings and buoyancy furnish an indication of ballast changes necessary for maintaining zero buoyancy. Similar derived values are diagrammaticaally indicated in Fig. 2 with reference to the determination of the velocity of sound under water.

The principal parts of the apparatus employed in carrying out the foregoing functions are shown in Fig. 3 and include a buoyancy recording unit which is designed for mounting on the diving panel of a submarine; a sound velocity recording unit which may be installed at any convenient point within the hull of the submarine; a computer unit which may also be located at any desired point within the submarine; and finally, two measuring units which are installed for alternate use, one being mounted at the top side of the submarine to be used primarily in recording information on sonar conditions; the other being installed at the bottom side of the submarine near the center of buoyancy for use in predicting ballast changes necessary for maintaining the submarine in trim. Sea pressure conduits are independently connected to the computer unit and to each of the recording units.

The general organization of the several units of Fig. 3, provides for the two measuring units being electrically connected to feed their output voltages into the computer, while the latter member is connected to each of the recording units so as to constantly furnish voltage values to these units. The measuring units and their functions have been illustrated in greater detail in Figs. 4, 5, 6 and 7. The computer unit and its potentiometer mechanism has been further illustrated in Figs. 8, 9, 10 and 11, while the buoyancy recorder mechanism has been illustrated in Figs. 12, 13, 14 and 15.

Considering first the temperature measuring unit as illustrated in Fig. 4, numeral 101 denotes a base plate which is adapted to be secured at some convenient point along the exterior surface of the hull of a submarine, as for example at the bottom side of the hull as near the central portion as possible. In this position, the temperature measuring unit is constantly exposed to contact by sea water in which the submarine is immersed. If desired, the base plate may be enclosed by a perforated cover (not shown) which may comprise a simple metal cap of sufficient strength and rigidity to withstand sea water pressures commonly encountered in the operation of submarines.

Supported on the base plate 101 is a pressure-resistant housing 102 in which electrical connections may be made and communicating with the housing is a conventional terminal head to which is connected a pressure-tight fitting 103. Extending outwardly from the terminal head and fitting 103 is a resistance thermometer bulb comprising a metal core 104 which supports an open bronze frame consisting of fins 105 about which is wound a helical capillary tube 106. Located within capillary tube 106 are several strands of insulated nickel wire 107. The electrical resistance of the nickel wire is chosen in accordance with the usual practices of the temperature measuring art so that its resistance in normal operation varies approximately from 218 to 261 ohms. One end of the capillary tube 106 is sealed and the other end is soldered into the center core 104, and the leads from the nickel wire are carried through the core to the terminal head. A valuable characteristic of this temperature measuring arrangement has been found to be a remarkably high speed of response of the bulb to temperature charnges, a factor which is essential in carrying out rapid calculations of the sort described.

The temperature bulb forms a part of a temperature measuring circuit which constitutes a Wheatstone bridge, as shown schematically in Fig. 7. This circuit includes a potentiometer slide wire R1 and fixed resistances R2, R3, R4, R5, R6 and R7, as indicated, and the topside and bottomside temperature bulbs, either of which may be selected by the switch at *b* to form the variable resistance factor of the Wheatstone bridge which is energized from an insulated secondary winding of transformer T'. When the voltage drop from *a* to *c* (Fig. 7) is equal to the voltage drop from *a* to *x*, no voltage exists between terminals *d* and *e* and the bridge is in balance. However, if the temperature at the bulb increases, the voltage drop from *a* to *c* exceeds that from *a* to *x*, the difference being applied to the amplifier at *d* and *e*. The amplifier then causes servomotor 146 connected to the output of the amplifier to move shaft 140 and the sliding contact of slide wire R1 upwardly, thereby increasing the resistance between *a* and *x* until a balance is re-established. If the temperature at the bulb decreases, the contact is caused to move down, thereby decreasing the resistance between *a* and *x*. For the same incremental increase or decrease in temperature, the voltage applied to the amplifier is the same. However, the voltage is shifted in phase with respect to the line voltage by 180 electrical degrees in going from one side of balance to the other. The direction of motor rotation for the correction of an unbalance is determined by this phase relationship. When the check switch 164 is in position 2, the resistances R6 and R7 are in the circuit and the bulb resistance does not control the position of the sliding contact. R6 and R7 are proportioned so that with the switch 164 in position 2 the sliding contact is moved to the point on the potentiometer corresponding to a temperature reading such as 30° F. This provides a convenient means for setting the temperature indicating dial 161 which is coupled to the sliding contact of potentiometer R1 (Fig. 8).

Mounted above the temperature bulb, as shown in Fig. 4, is an electrical conductivity measuring cell which is supported on the upper part of the pressure resistant housing 102 and consists of a tubular member 108. As shown more clearly in Fig. 5, the conductivity cell is constructed of an insulating tube 109 sheathed in a metallic shell 108. Within tubular member 109 are located three metal cylinders 110, 111 and 112 axially spaced and insulated to function as electrodes to which an energizing potential is applied. Sea water is permitted to flow freely through the conductivity cell. The lead to the center electrode 111 is insulated and approximately half of the current in this lead flows through the sea water sample to each end electrode, the two paths from the center electrode being in parallel. The measured conductance is the sum of the conductance of those two paths. The two end electrodes 110 and 112 are connected together and grounded. Thus, they are at the same potential and no current can flow between them through any external shunt path. With a fixed applied potential, the electric current in the lead connected to center electrode 111 is determined by the specific conductance of the sea water and by the dimensions of the cell and its electrodes. Since the dimensions are constant, the electric current can be used as a measure of specific conductance and the number by which the measured conductance is multiplied to give the specific conductance is called "cell constant." The electrodes are preferably made of a noble metal such as platinum to minimize corrosion. While cells of similar design can be readily made with cell constants within two or three percent of each other, it is preferred for accurate measurements to make an individual calibration for each cell before use.

The sea water sample present in the tubular member functions as a variable resistance in the conductivity measuring circuit of Fig. 6. The circuit consists of a voltage balancing arrangement which includes fixed resistances R9, R10, R11 and R12 or R13 and the potentiometer slide wire R8, whose contact position is a function of specific conductivity of sea water. The topside and bottomside conductivity cells are shown at the right-hand side of the circuit and are selected by the same switching operation used for the thermometer bulbs in Fig. 7. Power is supplied to the circuit from two isolated secondaries of a transformer T, connected to the line as shown. The voltage drop across R8 is proportional to the secondary voltage since the resistance in series with it is constant. The voltage drop across R12 or R13 is dependent upon the amount of current passing through the selected cell. This current as previously mentioned, is proportional to the specific conductance of the water sample in the cell. When the voltage drop across R13 is equal to the voltage drop from *f* to *y*, no voltage exists between terminals *g* and *h* of the amplifier and the circuit is in balance. However, if the specific conductance of the water sample increases, the voltage drop across R13 exceeds that from *f* to *y*, the difference being applied to the amplifier at *g* and *h*. The output of the amplifier then causes the servomotor which is connected thereto to move the sliding contact up until a balance is re-established. If the specific conductance decreases, the contact moves down.

The switch in series with the cell is opened for checking the specific conductance. Opening the switch reduces the current through R13 to zero with the result that the sliding contact is moved by the motor until the voltage drop from the bottom end of the potentiometer to the sliding contact is equal to the voltage drop across R9. The water sample passing through the cell is equivalent to a resistance in series with a small capacitive reactance, producing a small phase shift in the current through the cell with respect to the applied voltage. Condenser C1 is used to shift the phase of the current through R8 so that it is approximately in phase with the current through the cell. This provides for better operation of the amplifier and servomotor.

It will be seen that the conductivity measuring unit, together with the temperature measuring unit previously described, furnish separate voltage changes which may be electrically combined, in accordance with the steps indicated in Fig. 1, to provide indications of salinity, density and buoyancy. A third measured variable is the sea water pressure which may be readily measured by a conventional pressure measuring device such as a Bourdon tube, and converted to a third voltage value. In providing electrical apparatus which will properly combine these voltage changes to yield the desired values of salinity, density, buoyancy and buoyancy change in the order noted, it is essential to employ certain numerical relationships which are best represented in the form of equations. In setting up such equations, certain values and constants are employed.

The density of sea water is defined as the mass per unit volume, using as a unit, grams per cubic centimeter. Since the density of sea water varies through the approximate range of 1.000 to 1.030, it is convenient to subtract 1.000 from the numerical value and multiply by 1,000, and thus represent a density of 1.02485, for example, by the number 24.85. A symbol will be used to represent density in this notation. Salinity is defined as the total weight of salts, in grams, in 1000 grams of sea water. The symbol for this unit is $^0/_{00}$ referred to as parts per thousand. Pressure is specified in terms of equivalent depth, an average value of the water density being used in the conversion.

Numerical relationships between density, temperature and salinity are obtained from established oceanographic tables containing this data and likewise the effects of depth on density can be furnished. Since the temperature effect on the depth correction is small, it is neglected. An instrument which computes density by measuring temperature, salinity, and pressure must combine these factors in such a manner as to be in agreement with the above-mentioned oceanographic tables. Since these relationships are nonlinear and rather complex, it is very difficult to obtain exactly correct results, but a close approximation to the actual density can be obtained by adding independent functions of temperature, salinity, and depth. Such a function can be represented by the following equation:

$$\sigma=26.997+0.10617T-0.0024018T^2+0.0000054343T^3+0.78(S-35)+0.00142D$$

in which $\sigma$ is the density as previously defined, T is the temperature in degrees Fahrenheit, S is the salinity in parts per thousand, and D is the depth in feet. Since the instrument is used in measuring density changes, and inasmuch as these changes during any period of submergence of the ship are usually only a small fraction of the total change possible (about a maximum of eight density units), the errors resulting from the use of the approximate relationships are very small.

Salinity of the sea water is determined by the measurement of the specific electrical conductance thereof. However, since the electrical conductance is affected by the temperature of the water as well as the salinity, it is necessary to compensate for temperature changes. The relationships between salinity and specific conductance, and temperature may be determined from tables of established oceanographic data of the type already referred to. A close approximation to these relationships is the equation $$S=\left[\frac{100,000}{25.661+0.73720T}-348.87\right]C^{1.0946}$$

in which S is the salinity in parts per thousand, T is the temperature in degrees Fahrenheit, and C is the specific conductance in mhos per centimeter cube.

By measuring the temperature and specific electrical conductance of the sea water, the instrument computes the potential density, i. e., the density the water would have if it were brought to the surface, by combining functions of these variables according to the equation $$\sigma=26.997+0.10617T-0.0024018^2+0.0000054343T^3+0.78\left[\left(\frac{100,000}{25.661+0.73720T}-348.87\right)\right]C^{1.0946}-35$$

Since the hull of a ship compresses with increasing depth, decreasing its volume and therefore the buoyant force of the displaced water, ballast must be changed to account for this effect. The hull compression factor for a ship is expressed in pounds of ballast to be pumped per 100 feet increase in depth. This factor includes the effect of the change in density of the water with depth as well as the effect of the changes in the hull dimensions.

For a ship having a submerged displacement of W pounds, a change in density of one part in a thousand will change the buoyant force of the water on the ship by $W/1000$ pounds. Thus, when a ship of compression factor B moves from water of temperature $T_1$, specific conductance $C_1$, and depth $D_1$ to a location where the water has the temperature $T_2$, specific conductance $C_2$, and depth $D_2$, the ballst change $b_2-b_1$, indicated by the horizontal motion of the pen on the buoyancy recorder, illustrated in Fig. 12, is determined by the equation $$b_2-b_1=\frac{W}{100}\left\{0.10617(T_2-T_1)-0.0024018(T_2^2-T_1^2)+0.0000054343(T_2^3-T_1^3)+0.78\left[\left(\frac{100,000}{25.661+0.73720T_2}-348.87\right)C_2^{1.0946}-\left(\frac{100,000}{25.661+0.73720T_1}-348.87\right)C_1^{1.0946}\right]\right\}-\frac{B}{100}(D_2-D_1)$$

When $b_2-b_1$ is positive the pen moves to the left, indicating the amount by which the ballast is to be increased (Flood). When $b_2-b_1$ is negative the pen moves to the right, indicating the amount by which the ballast is to be decreased (Pump).

All of the computations outlined above are made electrically by converting the various factors into voltages and combining them in accordance with the equation.

Attention is now directed to Figs. 8 through 11, inclusive, in which computing apparatus is illustrated for combining voltage values in accordance with the foregoing equations. This apparatus includes a temperature computing mechanism, a conductivity computing mechanism, and a hull compression factor computing mechanism suitably connected together by electrical means. Numeral 118 (Fig. 10) denotes a casing member equipped with a detachable cover which has been removed to disclose the computer mechanism in greater detail. The casing member is adapted to be secured to a wall portion of a submarine by means of brackets preferably secured at the corners thereof. A number of cable conduits 122 (Fig. 8) are received through one side of the casing to provide a means of electrically connecting the outside measuring units and the recording mechanisms to the computer circuits. 124 is a conduit for a cable connecting the computing apparatus with the power line of the submarine which preferably consists of a 115-volt 60-cycle supply line.

At the left-hand side of Fig. 8 is a temperature computing unit which includes a frame 126 pivotally mounted on a vertical shaft 128 which in turn is supported in bracket 130. The entire unit may be swung out of the casing about shaft 128 when bolt 132 is disengaged from lug 134. The frame 126 consists of a pair of spaced-apart plates 136 and 138 which may more clearly be seen in Fig. 9. Rotatably journalled in the plates is a shaft 140 which through a pinion is driven by a gear 142 in mesh with a gear train 144 which is supported between the plates on studs and driven by a motor 146 mounted above the unit. Two short insulating cylinders 148 and 150, which for example, may be formed of Bakelite, are secured to plates 136 and 138. The cylinders support a group of potentiometer wires which extend in a circumferential direction about the cylinders and which include the slide wires already referred to in connection with the description of the circuits illustrated in Figs. 6 and 7. Thus, R1 which is the slide wire of the Wheatstone bridge temperature measuring circuit, is supported on the cylinder in a position such that it is readily engaged by a contact element 152 which is supported on contact arm 154, the latter arm being fixed to shaft 140. The remaining fixed resistances R2, R3, R4, R5, R6 and R7 are attached to a ring member received in the cylinder 148, several of which are shown in Fig. 8.

When there is a change in temperature at the thermometer bulb, its resistance changes and unbalances the Wheatstone bridge. This unbalance, after amplification by amplifying tubes A mounted in the top of the casing, causes the motor 146 to drive shaft 140 thereby moving the contact arm 154 and contact element 152 until a balanced condition is again re-established. The position of the contact, and accordingly the position of the shaft, is then representative of the sea water temperature. Since the contact arms of all other potentiometer wires on the temperature unit are fixed to shaft 140, each contact element takes a position on its wire corresponding to the measured temperature. The measuring circuit is designed so that the angular position of the shaft is directly proportional to temperature.

An indication of density is provided by a potentiometer R14 which is in the circuit to furnish a density function of temperature at a constant salinity of 35‰. Since this function is not linear with temperature, an arrangement must be used for obtaining the proper curvature from the slide wire. It has been found that this may successfully be done by tapping the potentiometer 14 at several points and shunting each section separately with a resistance. With this arrangement it is possible to approximate the curve relating density to temperature by a series of interconnecting straight lines. Twelve shunt resistances are preferably used with potentiometer R14 and are denoted by R15. A contact for potentiometer R14 is indicated by numeral 158 (Fig. 8), which is carried by the arm 160 which is also secured to shaft 140, but insulated therefrom.

Potentiometer R39 (Fig. 10) secured to the Bakelite cylinder 150 provides temperature compensation for the conductivity measurement in terms of density. This potentiometer is also engaged by a sliding contact similar to those described above. Likewise, twelve shunt resistance spools are supported in the cylinder 150 for providing the curvature approximation.

The measured temperature is conveniently indicated by a dial 161 which is mounted on shaft 140 and registers with an indicator 162 secured to the frame 136 and 138. The dial 161 may be calibrated such that each scale division represents one degree Fahrenheit. A switch 164, illustrated in Fig. 9, and corresponding to the check switch of Fig. 7, is used to check the temperature unit in the manner previously described.

The conductivity computing unit of the system is shown at the right-hand side of Fig. 8 and is further illustrated in Figs. 9, 10 and 11. The unit is pivotally mounted on a vertical shaft 168 whereby the entire unit can be swung outwardly when bolt 170 is released. A frame for supporting the unit is made up of a pair of spaced-apart plates 172 and 174 in which is journaled a shaft 176. A gear train 177, which is also supported by the frame, is so arranged that it drives the shaft from a motor 178 mounted above the unit.

Two potentiometer elements are supported on opposite sides of the frame in a position such that they may be engaged by sliding contacts which are carried by arms secured to shaft 176. Thus, R8, a potentiometer already noted in connection with the circuit of Fig. 6, is located on the rear side of the frame, as viewed in Fig. 8, being mounted on insulating member 173 which in turn is secured to plate 172. Also mounted on plate 172 are the remaining resistances R9, R10, R11 and the phasing condenser C1 shown in Fig. 6. The conductivity cell and its calibrating resistances R12 and R13 together with the supply transformer (of Fig. 6) complete the circuit forming a bridge network. When there is a change in the specific conductance of the water passing through the conductivity cell illustrated in Fig. 6, the bridge is unbalanced. This unbalance after amplification causes servomotor 178, mounted above the unit, to drive shaft 176, which in turn moves an arm and a contact fixed thereto into a position on the potentiometer R8 at which balance is re-established. The position of the contact and accordingly the position of the shaft, is then representative of the specific conductance of the sea water in the cell.

Mounted on the plate 174 is an insulated cylinder 180 which has secured to its periphery a potentiometer R69 adapted to be engaged by a contact 182 which is carried by an arm secured to shaft 176. R69 is connected in the circuit for the computation of salinity values. Movement of contact 182 is controlled both by rotation of shaft 176, and by the action of a cam follower on a cam fixed to shaft 176 (not shown). The contact arm is forced outwardly in response to movement of the cam follower as shaft 176 turns and the shape of the cam being cut so that the output voltage of the potentiometer from the zero end to the sliding contact is proportional to the measured specific conductance raised to the 1.0946 power. This is the conductivity function necessary for computing salinity.

The measured specific conductance is indicated by dial 186 (Fig. 8) which is mounted on shaft 176 and adapted for rotation adjacent an indicator 188. Each scale division of the dial represents .001 mho per centimeter cube. Numeral 190 refers to a switch shaft for checking the conductivity unit, this switch corresponding to the check switch discussed in connection with Fig. 6. This shaft is accessible for screw driver operation when the computer cover is removed.

Located within the casing at one side of the switch shaft is a cell constant unit 192 (Figs. 8 and 9). On this member are secured the fixed resistances R12 and R13 for the cells in the bottom side and top side measuring units respectively, each spool being automatically connected into the circuit when its respective cell is being used. The relationship between the conductance measured by a cell and the specific conductance depends upon the dimensions of the cell and electrodes. Since all cells may not be exactly identical, each is provided with a specific value of resistance so that its characteristics can be fitted to the measuring circuit.

In Fig. 9 is illustrated a hull compression unit 194 including a housing within which is vertically mounted a Bourbon tube of the usual type consisting of a helical tube which is connected by a capillary 196 to a pressure conduit which is at sea water pressure. As is customary in pressure measuring devices of this type, changes in depth and therefore pressure transmitted through the capillary to the helical tube rotate the free end of the helical tube. This rotation is transmitted by a center shaft to a contact moving it across potentiometer R70 supported at one side of the housing, from which a voltage is obtained proportional to depth. The details of the Bourdon tube, shaft and contact are of standard construction well known to the art and have not been illustrated in the drawings. Calibrating resistances of the type already described are attached to the hull compression unit and preferably the contact for R70 is made adjustable to take into account the vertical distance between the bottom side and top side measuring unit.

The hull compression unit is provided to take into account the ballast changes required by the increase in the compression of the hull of the ship with depth, and the increase in the density of the sea water with pressure due to depth. With an increase in depth, the pressure in the Bourdon tube increases thereby moving the sliding contact across potentiometer R70, with the result that the depth measurement is converted to an electrical value. The unit includes fixed resistances necessary for providing for a maximum hull compression factor of 2500 pounds per 100 feet. Output of the potentiometer R70 can be adjusted by a rheostat, the dial of which is indicated by numeral 198 in Fig. 8. Suitable switching means of conventional character may also be provided for connecting the measuring units from either the top side or bottom side location to the computer. The hull compression unit together with the temperature unit and conductivity unit are diagrammatically indicated in the circuit diagrams of Fig. 12.

The voltage changes produced by measured values of temperature, conductivity and hull compressibility are electrically combined as shown in Fig. 12 to provide a single fluctuating voltage value which provides a measure of buoyancy change which is visually indicated by means of a suitable recording mechanism.

The construction and manner of operation of the recorder mechanism is illustrated in Figs. 14 through 18, inclusive. In general, the recorder is housed in a casing which includes base members 50 and 52 to which are fastened sides 54 and 56 and a hinged front panel 58 of curved formation carrying a glass window 59. Numeral 60 denotes a detachable rear panel. Suitable connecting plugs are provided in the sides 54 and 56 as well as a top plate 62 for receiving electrical and mechanical connections to the instrument components contained in the case. Supported on the inner, upper surface of the case is a curved chart-holding plate 66 which is adapted to locate a chart 68 directly in front of the window 59 and in position to receive thereon a pen 70 carried by a curved arm 72 which is in turn fixed to one end of a pivot rod 73. The latter member has its opposite end pivotally connected in a frame 90 carried by the sliding carriage 81 of the recorder actuating mechanism.

The chart is provided with vertical subdivisions which indicate depth in feet and horizontal subdivisions which indicate buoyancy change in thousands of pounds of ballast. The recording mechanism is so arranged that movement of the pen to the left of the chart indicates flood, and movement of the pen in the opposite direction indicates pump.

Included in the actuating mechanism are two transverse, parallel rods 78 and 80 which are firmly supported between the sides of the recording casing, as shown in Figs. 14 and 15. Slidably mounted on these rods is carriage 81, shown in detail in Fig. 18 and consisting of plates 82 and 84 bolted to spacer 85 and supporting a frontside 86. Tilting frame 90, shown in detail in Figs. 16 and 17, is pivoted in the frontside 86 on a stud 88. Arm 98 is pivotally mounted in frame 90 between ears 92 and 94 and has rigidly secured to its lower end pen support rod 73.

Two additional transverse rods 76 and 77 are arranged parallel to each other and to rods 78 and 80. Rods 76 and 77 have their extremities rigidly secured in end plates 74 and 75, each of which plates is pivotally mounted in sides 54 and 56, respectively, by studs 79. The uppermost rod 77 is arranged so that it engages slot 97 in arm 98, whereby movement of rod 77 by rotation of plates 74 and 75 on studs 79 in turn causes arm 98 to pivot in frame 90, thus moving rod 73 and pen arm 72 in a vertical direction over chart 68 for any horizontal location of carriage 81.

Attached to rod 76 at a point closely adjacent to end plate 74 is a link mechanism 51 which is in turn connected to a conventional Bourdon tube 53. With this arrangement, sea water pressure fluctuation acting through conduit 55 causes motion of Bourdon tube 53 at its free end, which in turn actuates the link mechanism 51 and through the motion of pivoted rods 76 and 77 controls the vertical movement of pen arm 72.

As seen in Figs. 14 and 15, a pulley 91 driven by shaft 93 of servomotor 95, mounted on bracket 71, drives pulley 89 by means of cable 87 which is also attached to plate 84 of carriage 81. Potentiometer R76 is located on bracket 71 at the right side, as viewed in Fig. 15, in line with motor 95 and shaft 99 but has been omitted from Fig. 15 in the interests of simplicity. The sliding contact of potentiometer R76 is mounted on shaft 99 so that its position is controlled by servomotor 95. The lateral motion of sliding carriage 81, and hence pen 70, is directly proportional to the angular rotation of shaft 99, the sliding carriage 81 being thereby moved by means of cable 87 to translate changes in the output of balancing potentiometer R76 into a horizontal displacement of carriage 81 along rods 78 and 80.

At the left side of the casing, as viewed in Fig. 15, there is illustrated a housing 63 mounted on wall 54 which contains potentiometer R77 having a sliding contact 64 mounted on shaft 65. Potentiometer R77 is further indicated in Figs. 7 and 12 and is conveniently referred to as a trim setting potentiometer. The sliding contact 64 is positioned by means of a knob 67 on shaft 65, and the corresponding buoyancy change is indicated by dail 69 and indicator 61.

The balancing potentiometer R76 combines all of the computed functions to indicate buoyancy change. The trim setting potentiometer R77 is provided for adjusting the pen position to the zero line on the chart when the ship is first trimmed. This is necessary so that the instrument will provide for a buoyancy change range of 200,000 pounds without extending the scale beyond the requirements of any single operation. Calibrating resistances R78, R80, R81 and R82 are selected in accordance with well known bridge computation methods to make the pen motion proportional to the computed buoyancy change, these resistors being connected as shown in Fig. 12.

Figs. 6, 7 and 12 illustrate the circuits used for computing ballast changes making use of the above-described recording, measuring and computing apparatus. Shown in the diagrams referred to in a proper operative position are the various potentiometers described, including the balancing potentiometer R76; trim setting potentiometer R77 in the buoyancy recorder; R70 in the hull compression unit; R14 in the temperature unit relating density to temperature for a constant salinity of 35‰; R69 in the conductivity unit, the output of which is a function of the specific conductance of sea water; R39 in the temperature unit to provide temperature compensation for the conductivity measurement in terms of density; and R75 consisting of a rheostat in the computer. All remaining resistances shown in Fig. 12 are fixed in value as noted above.

The contact on R70, Fig. 12, is moved linearly with depth. The contacts on R14 and R39 are moved linearly with temperature by motor 146. The contact on R77 is set manually, and the contact on R76 is positioned by servomotor 95, controlled by amplifier 95A. The contact on R69 is moved by servomotor 178 according to a function of specific conductance. The contact on R76 is positioned so that the voltage from *a* to *b* (Fig. 12) is always equal to the algebraic sum of the output voltages of the other potentiometers.

The dot adjacent to one end of each transformer secondary in Fig. 12 is a polarity mark which represents that, at any instant, all of the dotted ends have the same polarity. The voltage drop from one point in a circuit to another point in the same circuit is defined as positive when the first point is nearer the dotted end than the second, as for example, from *e* to *g*. Conversely, when the second point is nearer the dotted end than the first, the voltage drop is negative, as from *c* to *d*. The arrow above R70 indicates the direction of motion of the contact with increasing depth. The arrows above R14 and R39 indicate the direction of motion of the respective contacts with increasing temperature. The arrow above R69 indicates the direction of motion of the contact with increasing specific conductance.

When the salinity switch (shown in two sections) is in position 2, the conductivity measurements are not included in the computations. For this condition, contact *b* is stationary when the voltage from *a* to *b* equals the voltage from *e* to *g* minus the voltage from *c* to *d* (since the latter voltage is negative). When the depth increases, contact *d* moves in the direction of the arrow, making the algebraic sum of these voltages smaller. The difference between the new value and the voltage from *a* to *b* is applied to amplifier 95A which causes servomotor 95 to move contact *b* in the "Pump" direction. This is a condition which exists when a ship moves down in isothermal water. The hull compresses, reducing the buoyant force, and pumping of ballast is required to retain a condition of zero buoyancy. If the temperature decreases, contact *g* moves to the right, making the algebraic sum of the voltages from *c* to *d* and *e* to *g* greater. The motor 95 then moves contact *b* in the "Flood" direction. Flooding is required in this condition, since a decrease in temperature means a higher density of the water, with a corresponding increase in the buoyant force exerted on the ship. For any value of temperature the voltage from *e* to *g* is proportional to the density value corresponding to the first four terms in the equation in column 5, line 40. The required function of temperature is obtained by using the proper distribution of effective resistance in slide wire potentiometer R14, which is accomplished by bringing out taps from the potentiometer and shunting each section separately with a fixed resistance as described heretofore.

When the salinity switch is in position 1, the conductivity measurements are included in the computations. The contact on R69 is positioned according to a function of specific conductance, making the voltage from *j* to *k*, applied to the primary of the connected transformer, proportional to this function. The current through R39 is proportional to the primary voltage. Since the voltage from *h* to *i* is equal to the product of the current through the potentiometer R39 by the resistance from *h* to *i*, this voltage is proportional to the product of a conductivity function by a temperature function. The circuit is designed so that this output voltage corresponds to the equation described above.

When the water temperature is constant, but the salinity becomes greater, the specific conductance increases and the voltage from *h* to *i* becomes greater, causing contact *b* to move in the "Flood" direction. Flooding is required for this condition because an increase in salinity produces an increase in density. If the salinity remains constant while the temperature increases, the specific conductance will increase. Contact *i* will move to the left, reducing the resistance from *h* to *i*, while contact *k* moves to the right, increasing the current through R39, the voltage from *h* to *i* remaining constant. The resistance between *h* and *i* varies with temperature according to the term in the parentheses in the equation mentioned above. The nonlinearity of the function is provided for by the same means as is used in connection with potentiometer R14. The voltage from *j* to *k* varies according to $C^{1.0946}$. This is accomplished by means of a cam.

Since the output voltage from *h* to *i* is proportional to salinity, and since the equation for density, column 5, line 40, includes the term $(S-35)$, provision must be made to subtract a voltage corresponding to a salinity of 35‰. This is taken care of by the salinity switch in changing the connection from $e$ to $f$, the voltage from $e$ to $f$ being proportional to the density change corresponding to a salinity change of 35‰. Thus, when the salinity switch is moved from position 2 to position 1, the right section of the switch adds a voltage proportional to the density change corresponding to the actual salinity, while the left section subtracts a voltage proportional to a density change corresponding to a salinity of 35‰.

The contact on R76 moves in the "Pump" direction toward the dot when any of the contacts on R70, R14, R39 and R69 move toward their respective dotted ends, and in the "Flood" direction when any of these contacts move away from the dotted ends. The temperature, conductivity, and depth contacts may move individually or simultaneously, the movement of the contact on R76 always indicating the proper ballast change, as determined by the equation in column 6, line 11.

Changing the position of the contact of R75 changes the voltage drop across R70. If this contact is positioned to correspond to a certain hull compression constant, a given increase in depth varies the voltage from $c$ to $d$, in such a manner that the contact on R76 moves to indicate a certain amount of ballast to be pumped. If the hull compression constant were smaller, the contact on R75 would be set to the left of its original position, reducing the voltage drop across R70. The same change in depth would then cause a smaller voltage change, and the change on R76 would move a smaller distance in the "Pump" direction.

When the contact R77 is moved manually, the contact on R76 follows in the same direction, keeping the voltage from $a$ to $b$ constant for any fixed measured conditions. This provides a means for setting the pen of the buoyancy recorder to the zero line on the chart when the ship is first trimmed. Since the complete circuit involves a voltage balancing arrangement, and as all components of the circuits are supplied through transformers from the same line, normal changes in the voltage and frequency of the power supply do not affect the accuracy of the system.

The apparatus described can be employed in computing and recording other sea water relationships, an example of which may comprise the determination of velocity of sound in sea water. For this purpose, measuring units for temperature and conductivity similar to those already described are utilized, as suggested in Fig. 2. The computer unit may be equipped with additional potentiometers and a special sonar condition recording chart. Fig. 13 shows a specific circuit diagram and potentiometer arrangement for sound determinations.

In order to determine the velocity of sound in sea water, continuous values of the temperature and salinity, or specific conductance must be available. Certain functions of these factors can then be combined in a manner to provide a continuous record of the velocity of sound. The block diagram shown in Fig. 2 indicates the relationship between these various factors. The effect of pressure on the velocity of sound is small for the depths considered and is neglected. The numerical relationship between the velocity of sound in sea water and other variables are obtained by reference to standard tables in the manner already explained with reference to buoyancy changes. A close approximation to the actual velocity function can be obtained by adding independent functions of temperature and salinity, as represented by the equation $$V=4437.5+10.8845T-0.042049T^2+3.9\ (S-35)$$

in which V is the velocity of sound in feet per second, T is the temperature in degrees Fahrenheit, and S is the salinity in parts per thousand.

Salinity is determined from measurements of specific conductance and temperature according to the same equation used in obtaining salinity for the ballast change function. The horizontal position of the pen on the sonar condition recorder indicates the solution of the equation:

$$V=4437.5+10.8845T-0.042049T^2+3.9\left[\left\{\frac{100,000}{25.661+0.73720T}-348.87\right\}C^{1.0946}-35\right]$$

Since current practice in predicting sonar ranges makes use of temperature gradients, the chart for the sonar condition recorder is printed in equivalent temperature units. The relation between the velocity of sound and the equivalent degrees, $T_{eq}$, is $$V=4600+5T_{eq}$$

All of the computations for determining the velocity of sound are made electrically by converting the various variables into voltages and combining them according to the proper equations.

In the circuit illustrated in Fig. 13, R83 is the balancing potentiometer in the sonar condition recorder; R30 is the potentiometer on shaft 140 of the temperature unit which relates sound velocity to temperature for a constant salinity of 35‰; R69 is the potentiometer on shaft 176 of the conductivity unit, the output of which is a function of the specific conductance of the sea water; and R54 is the fourth potentiometer on shaft 140 of the temperature unit which provides the temperature compensation for the conductivity measurement in terms of sound velocity. The remaining reistances shown are fixed in value. The contacts, 137 on R30 and 163 on R54, are moved by shaft 140 linearly with temperature, as described above. The contact on R83 is positioned by servomotor 95' which is controlled by amplifier 95A'. The contact on R69 is moved by motor 178 according to a function of specific conductance. The contact on R83 is positioned so that the voltage from $l$ to $m$ (Fig. 13) is always equal to the algebraic sum of the output voltages of the other potentiometers. The dots and arrows on the drawing have the same significance as those in Figs. 16 and 18.

The salinity switch shown in Fig. 17 serves the same function as it does in the buoyancy change computing circuit. When the switch is in position 2, the voltage from $n$ to $o$ corresponds to the first three terms in the equation in column 11, line 67. When the temperature increases, contact $o$ moves to the right, increasing the voltage from $n$ to $o$. Amplifier 95A' then causes a servomotor 95' to move contact $n$ to the right until the voltage from $l$ to $n$ is the same as that from $n$ to $o$. An increase in temperature causes an increase in sound velocity.

When the salinity switch is in position 1, the conductivity measurements are included in the computations in the same manner as for the buoyancy change circuit. The contact on R83 moves to the left, toward the dot, when any of the contacts on R30, R54 and R69 move toward their respective dotted ends, and to the right when any of these contacts move away from the dotted ends. The contact on R83 is positioned according to the equation in column 11, line 78.

Since the complete circuit involves a voltage balancing arrangement, normal changes in the voltage and frequency of the power supply do not affect the accuracy of the system. A suitable chart recording mechanism corresponding to the recorder mechanism for ballast change may be employed to support a sound velocity chart across which a pen is moved in accordance with the voltage change described. If desired, various other charts may be employed to form curves of other sea water relationships relating to any of the measured or computed values.

Obviously many modifications and variations of the present invention are possible in the light of the above teachings. It is therefore to be understood that within the scope of the appended claims the invention may be practiced otherwise than as specifically described.

What we claim as new and desire to secure by Letters Patent of the United States is:

1. Apparatus for determining the ballast changes required to maintain a submarine in a condition of zero buoyancy comprising, a measuring unit adapted to be located on the hull of a submarine in a position in which the unit is continually exposed to contact with sea water through which the submarine passes, said measuring unit including a temperature measuring resistance bulb and an electrical conductivity measuring cell, a pressure measuring unit independently mounted on the hull of the submarine, an electromechanical computing member operatively connected to said temperature, conductivity and pressure measuring devices by means of an electrical circuit, said electrical circuit including first, second and third potentiometers positioned in response to the changes in temperature, conductivity and pressure respectively to derive fluctuating voltages which are independent functions of said variables, fourth and fifth potentiometers arranged to oppose said fluctuating voltages with balancing voltage, said balancing voltage being representative of the algebraic sum of the output voltages of the said first, second and third potentiometers at any given time, a recording mechanism controlled by said computing member, said recording mechanism including a chart holder, a chart, a pen arranged to engage with the chart, pen actuating means, and a balancing servo system operative to balance the voltage of said fourth and fifth potentiometers against the voltages of said first, second and third potentiometers of said computing member, said balancing servo system being connected to drive said pen actuating means to cause horizontal movement of the pen relative to the chart, and a pressure-responsive element moving said pen in a vertical direction relative to the chart, the combined horizontal and vertical indications of the pen on the chart denoting ballast changes for zero buoyancy at any given depth at which the submarine is operating.

2. Apparatus for determining the ballast changes required to maintain a submarine in a condition of zero buoyancy, comprising a measuring unit adapted to be located on the hull of a submarine in a position in which the unit is continuously exposed to contact with sea water through which the submarine passes, said measuring unit including a temperature measuring member and an electrical conductivity measuring device, a pressure measuring unit independently mounted on the hull of the submarine, an electromechanical computing member operatively connected to the temperature, conductivity and pressure measuring devices by means of an electrical circuit and including apparatus for producing rotation of a first shaft in accordance with changes in temperature and rotation of a second shaft in accordance with changes in conductivity and rotation of a third shaft in accordance with depth, said electrical circuit including first, second and third potentiometers responsive to the rotation of said first, second and third shafts respectively, being adapted to convert changes in temperature, conductivity and pressure into fluctuating voltages which are independent functions of these measurements, fourth and fifth potentiometer members arranged to oppose said fluctuating voltages, a recording mechanism controlled by the computing member, said recording mechanism including a chart holder, a chart, a pen arranged to engage with the chart, pen actuating means, an automatic self-balancing servo system operative to adjust the voltage sum of said fourth and fifth potentiometers to equal the algebraic sum of said fluctuating voltages at any time, the servo system also being adapted to drive said pen actuating means in a horizontal movement of said pen relative to said chart, and a second pressure responsive element for moving said pen in a vertical direction relative to said chart, the combined horizontal and vertical displacement of said pen relative to said chart denoting ballast changes for zero buoyancy at any given depth at which the submarine is operating.

3. A computer for predicting ballast changes of a submerged vessel comprising, means for measuring the electrical conductivity of the sea water surrounding said vessel including apparatus for producing rotation of a first shaft in accordance with changes in conductivity, means for measuring the temperature of the sea water surrounding said vessel including apparatus for producing rotation of a second shaft in accordance with changes in temperature, pressure responsive apparatus responsive to sea water pressure and producing rotation of a third shaft in accordance with depth of submersion of said vessel, a first energized potentiometer having its movable contact positioned by said first shaft, a second potentiometer energized in proportion to the voltage at the moving contact of said first potentiometer and having its movable contact positioned by said second shaft to produce a voltage proportional to the product of conductivity and temperature functions, said second potentiometer including a series of resistances shunted across portions thereof so arranged to produce a resistance distribution approximating the curve correcting conductivity for temperature variations, a third energized potentiometer having its movable contact positioned by said second shaft to produce voltage proportional to a temperature function, a series of resistances shunting portions of said third potentiometer and arranged to produce a resistance distribution approximating a curve converting salinity measurements to density measurements, a fourth energized potentiometer and having its movable contact positioned by said third shaft to produce a voltage proportional to hull compressibility, a voltage dropping resistance network energized from said source, said network including a slide wire having a movable contact selecting a local voltage in accordance with the position thereof, a balancing network combining the algebraic sum of the voltages at the movable contacts of said second, third and fourth potentiometers with said local voltage to produce a difference voltage, a servo system responsive to said difference voltage and acting to position said movable contact of said slide wire in a direction reducing said difference voltage to zero, and means for recording the position of the movable contact of said slide wire as an indication of the buoyancy of said submerged vessel.

4. A computer for predicting ballast changes in a submerged vessel comprising, means for measuring the electrical conductivity of the sea water surrounding said vessel including apparatus for producing rotation of a first shaft in accordance with changes in conductivity, means for measuring the temperature of the sea water surrounding said vessel including apparatus for producing rotation of a second shaft in accordance with changes in temperature, pressure responsive apparatus responsive to sea water pressure and producing rotation of a third shaft in accordance with the depth of submersion of said vessel, a potential source, a first slide wire energized from said source and having its movable contact positioned by said first shaft, a second slide wire energized in proportion to the voltage at the moving contact of said first slide wire and having its movable contact positioned by said second shaft, resistances shunting said second slide wire and at regular intervals and causing said second slide wire to possess an effective resistance distribution approximating a curve relating conductivity to temperature and producing a first output voltage proportional to the product of conductivity and temperature functions, a third slide wire energized from said source and having its movable contact positioned by said second shaft to produce a second output voltage proportional to a temperature function, a fourth slide wire energized from said source and having its movable contact positioned by said third shaft to produce a third output voltage proportional to hull compressibility, an electrical circuit combining said first, second and third output voltages to produce the algebraic sum thereof, a voltage dropping resistance network energized from said source, said network including a fifth slide wire having a movable contact selecting a local voltage as a linear function in the position thereof, a balancing network combining said algebraic sum voltage with said local voltage to produce a difference voltage, a servo system responsive to said difference voltage and acting to position said movable contact of said fifth slide wire in a direction reducing said difference voltage to zero, and recording means driven by said servo system to record the position of the movable contact of said fifth slide wire as an indication of the buoyancy of said submerged vessel.

5. A computer for predicting ballast changes of a submerged vessel comprising, means for measuring the electrical conductivity of the sea water surrounding said vessel including apparatus for producing rotation of a first shaft in accordance with changes in conductivity, means for measuring the temperature of the sea water surrounding said vessel including apparatus for producing rotation of a second shaft in accordance with changes in temperature, pressure responsive apparatus responsive to sea water pressure and producing rotation of a third shaft in accordance with the depth of submersion of said vessel, a potential source, a first slide wire energized from said source and having its movable contact positioned by said first shaft, a second slide wire energized in proportion to the voltage at the moving contact of said first slide wire and having its movable contact positioned by said second shaft, resistances shunting said second slide wire regular at regular intervals causing said second slide wire to possess an effective resistance distribution approximating a curve relating conductivity to temperature and producing a first output voltage proportional to the product of conductivity and temperature functions, a third slide wire energized from said source and having its movable contact positioned by said second shaft to produce a second output voltage, resistances shunting sections of said third slide wire causing a resistance distribution along said third slide wire approximating a curve relating density to temperature at a constant salinity, a fourth slide wire energized from said source and having its movable contact positioned by said third shaft to produce a third output voltage proportional to hull compressibility, an electrical circuit combining said first, second and third output voltages to produce the algebraic sum thereof, a voltage dropping resistance network energized from said source, said network including a fifth slide wire having a movable contact selecting a local voltage in accordance with the position thereof, a balancing network combining said algebraic sum voltage with said local voltage to produce a difference voltage, a servo system responsive to said difference voltage and acting to position said movable contact of said fifth slide wire in a direction reducing said difference voltage to zero, a recording mechanism including a chart holder, a chart, a pen arranged to engage with said chart, pen actuating means, said servo system being adapted to drive said pen actuating in a horizontal movement of said pen relative to said chart, a second pressure responsive element for moving said pen in a vertical direction relative to said chart, the combined horizontal and vertical displacement of said pen relative to said chart denoting ballast changes for zero buoyancy at any given depth at which the submarine is operating and means for adjusting the voltage selected by the movable contact of said fifth slide wire for any given position thereof to set the indication of said recorder to zero when the vessel is in trim.

References Cited in the file of this patent

UNITED STATES PATENTS 2,579,220 Vine ------------------ Dec. 18, 1951